United States Patent [19]

Langens et al.

[11] 4,233,280
[45] Nov. 11, 1980

[54] MANUFACTURE OF ANHYDROUS HYDROGEN CHLORIDE BY COMBUSTING CHLORINE-CONTAINING ORGANIC SUBSTANCES

[75] Inventors: Jan Langens, Kalmthout; Guido Devroe, Kapellen, both of Belgium

[73] Assignee: BASF Aktiengesellschaft, Fed. Rep. of Germany

[21] Appl. No.: 28,737

[22] Filed: Apr. 10, 1979

[30] Foreign Application Priority Data

Jun. 24, 1978 [DE] Fed. Rep. of Germany ....... 2827761

[51] Int. Cl.³ ............................................. C01B 7/08
[52] U.S. Cl. ..................................... 423/481; 423/488
[58] Field of Search ....................... 423/481, 486, 488

[56] References Cited

U.S. PATENT DOCUMENTS

| | | | |
|---|---|---|---|
| 3,394,056 | 7/1960 | Nadler et al. | 423/481 X |
| 4,018,879 | 4/1977 | Winnen | 423/481 |
| 4,073,871 | 2/1978 | Optiz et al. | 423/481 |

FOREIGN PATENT DOCUMENTS

| | | | |
|---|---|---|---|
| 1228232 | 7/1967 | Fed. Rep. of Germany | 423/481 |
| 1070515 | 6/1967 | United Kingdom | 423/481 |

*Primary Examiner*—Earl C. Thomas
*Attorney, Agent, or Firm*—Keil & Witherspoon

[57] ABSTRACT

A process for obtaining anhydrous hydrogen chloride from chlorine-containing organic residues by combusting these in an oxygen-containing atmosphere and separating the hydrogen chloride from the water formed during combustion. The residues are combusted in an oxygen-containing atmosphere under superatmospheric pressure and at above 2,000° C., the combustion products are then cooled and passed into a first cooling zone which contains a saturated solution of hydrogen chloride in water. the mixture of water, hydrogen chloride and the other combustion products is cooled in this zone and the mixture of gaseous hydrogen chloride and carbon dioxide is discharged from the cooling zone, cooled to a lower temperature in a second cooling zone, and separated from the aqueous hydrochloric acid.

3 Claims, 2 Drawing Figures

MANUFACTURE OF ANHYDROUS HYDROGEN CHLORIDE BY COMBUSTING CHLORINE-CONTAINING ORGANIC SUBSTANCES

The present invention relates to a process for combusting chlorine-containing organic substances with oxygen, whereby substantially anhydrous hydrogen chloride is produced and combustion energy is obtained.

The combustion of chlorine-containing organic substances produces carbon dioxide, carbon monoxide, water and hydrogen chloride. Processes for the recovery of chlorine from chlorine-containing organic substances, in which the latter are combusted and the hydrogen chloride is obtained in the form of an aqueous solution, as hydrochloric acid, have been disclosed. However, some industrially operated reactions require anhydrous hydrogen chloride. There thus exists a need to combust chlorine-containing organic residues in such a way as to obtain anhydrous hydrogen chloride by an economical method. For example, a process has been disclosed in which hydrogen chloride is eliminated from the chlorine-containing organic substances in a salt melt in the absence of oxygen; this hydrogen chloride is obtained substantially anhydrous and can thus be employed for chemical reactions. In a second stage, the chlorine-free organic substance is combusted with oxygen to give $CO_2$ and water. Working in a salt melt requires expensive equipment, so that such processes are not entirely satisfactory.

It is an object of the present invention to provide a process in which organic chlorine-containing substances are combusted in an oxygen atmosphere, giving hydrogen chloride which is substantially free from water, carbon monoxide and chlorine.

We have found that this object is achieved by a process for obtaining anhydrous hydrogen chloride from chlorine-containing organic residues by combusting these in an oxygen-containing atmosphere and separating the hydrogen chloride from the water formed during combustion, wherein the combustion of the residues, which should contain hydrogen and chlorine in a weight ratio greater than 0.028, is carried out in an atmosphere containing more than 80% by volume of oxygen, at pressures of from 1 to 100 bar and at above 2,000° C., the combustion products are cooled to from 200° to 800° C. and are then passed into a first cooling zone which contains a solution of hydrogen chloride in water, the mixture of water, hydrogen chloride and the other combustion products is cooled to from 10° to 80° C., the gaseous mixture which contains hydrogen chloride and carbon dioxide is discharged from the first cooling zone and cooled to from −40° to 0° C. in a second cooling zone, and is separated from the aqueous hydrochloric acid which condenses and is discharged from the second cooling zone.

The process has the advantage that substantially anhydrous hydrogen chloride, which is furthermore free from volatile iron compounds and which only retains carbon dioxide and traces of carbon monoxide, hydrogen and chloride, is obtained in a technically simple manner. The hydrogen chloride, in the form in which it is obtained, can be employed for chemical reactions in which the presence of carbon dioxide does not interfere. Such a reaction is, for example, the production of dichloroethane by the oxychlorination process.

DETAILED DESCRIPTION

Figure 1:
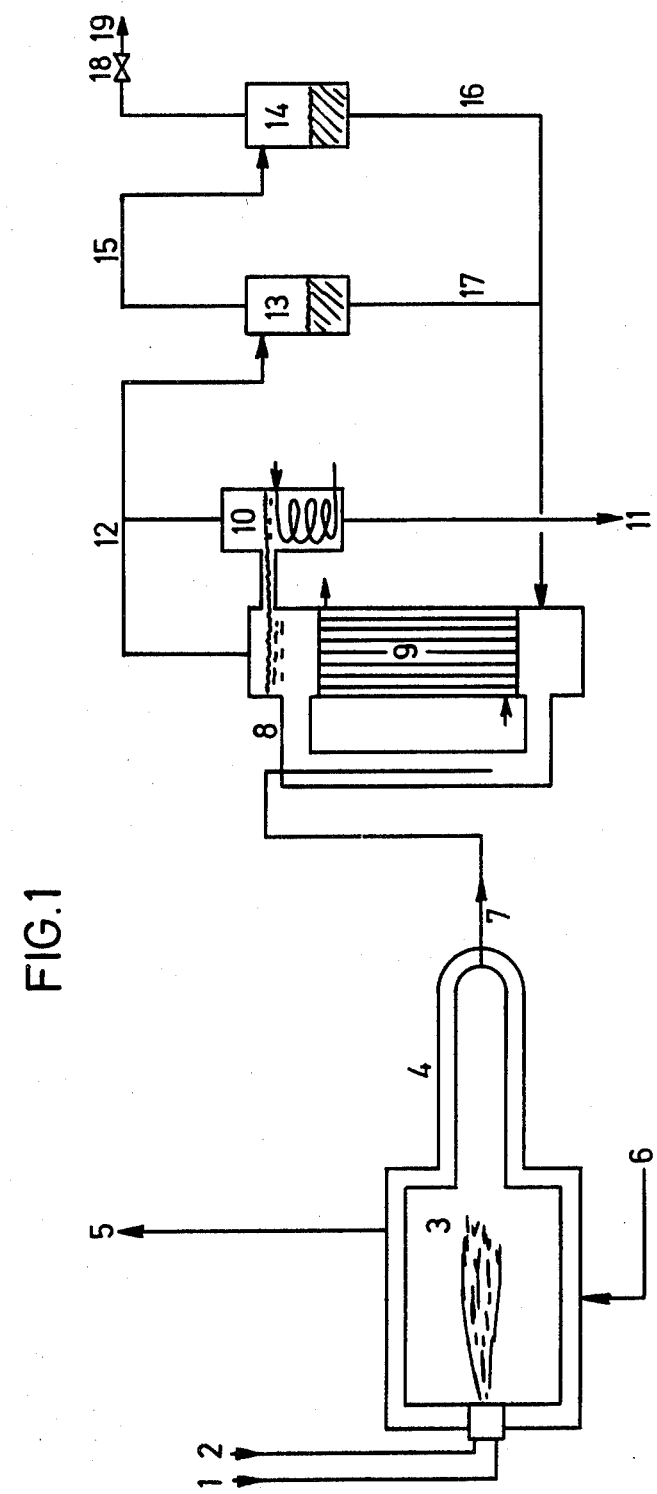
FIG. 1 illustrates a process according to the present invention, as described in Example 1.

The process may in particular be used for the combustion of liquid organic compounds which contain chlorine, carbon and hydrogen and may also contain oxygen, or of mixtures of such compounds which contain chlorine. Examples of such substances are liquid organic compounds obtained as distillation residues from the manufacture of vinyl chloride. The weight ratio of hydrogen to chlorine in the compounds or mixtures should correspond to at most 35.5 g of chlorine per g of hydrogen. The weight ratio of hydrogen to chlorine should thus be greater than 0.028, and is advantageously from 0.035 to 0.07.

The combustion of the chlorine-containing products is carried out with such amounts of oxygen that no soot and no chlorine are formed. An excess of oxygen would result in free chlorine being formed in the combustion mixture. A deficiency of oxygen causes soot formation in the combustion zone. It is most advantageous to use a method where the CO and $Cl_2$ contents of the combustion gases are determined by analytical instruments and the amount of oxygen is controlled accordingly. If the CO content is high, more oxygen must be added, and vice versa. The ratio of oxygen to chlorine-containing organic compounds which is employed is such as to avoid the formation of free chlorine under the particular conditions. The combustion takes place at a pressure of from 1 to 100, advantageously from 2 to 30, and especially from 4 to 10, bar.

The oxygen-containing atmosphere may consist of pure oxygen or of a mixture of oxygen with inert gases. In order to obtain very high temperatures, a very high oxygen content, for example more than 90% by volume, is used.

The combustion takes place at above 2,000° C., advantageously above 2,200° C. and especially above 2,500° C.

Advantageously, the combustion is carried out in a combustion chamber equipped with a device for removing the resulting heat. For example, the combustion chamber can be surrounded by a cooling jacket used to generate steam. Thus, for example, 4 kilograms of steam, or even more, can be generated per kilogram of chlorine-containing products. At least 70% of the heat of combustion can be recovered by this method. The combustion chamber can be made from normal carbon steel lined with a metal or metal alloy which resists hydrogen chloride and chlorine.

The cooling jacket cools the combustion products to from 200° to 800° C., preferably from 500° to 700° C. If the residues contain small amounts of iron, the temperature of the combustion products after such cooling should be above 500° C.

The combustion products, cooled to the stated temperatures, are now passed into a first cooling zone, which contains a solution of hydrogen chloride in water. In most cases, it is not necessary to add water to the solution. The solution consists of the water formed during combustion, saturated with hydrogen chloride. The hydrogen chloride concentration in the solution depends on the prevailing temperature and pressure.

Under a pressure of 2.68 bar, at 60° C., the hydrogen chloride concentration is about 40% by weight. In this first cooling zone, the mixture of water, hydrogen chloride and other combustion products is cooled to from 10° to 80° C., advantageously to from 40° to 60° C.

The first cooling zone is advantageously in the form of a circulatory reactor, the cooling device being mounted on a part thereof. The saturated solution of hydrogen chloride present in the reactor is circulated, on the air-lift pump principle, as a result of the introduction of the combustion gas. At the same time, the combustion gas mixture is scrubbed, so that small amounts of metal chlorides and soot remain in the first cooling zone. In order to maintain the level of liquid in the circulatory reactor, a constant amount per unit time can be taken off the reactor. It is however also possible to pass the liquid phase, via an overflow, to a vaporizer in which hydrogen chloride is expelled from the solution, the concentration (in the liquid phase) falling to about 20% of HCl. This hydrochloric acid solution is then discharged from the vaporizer, together with the impurities.

However, it is also possible to discharge the small amounts of soot which may deposit in the first cooling zone, together with a small proportion of saturated hydrogen chloride solution, and to introduce this mixture, together with the chlorine-containing organic compounds, into the combustion zone.

The gaseous constituents, which in the main consist of hydrogen chloride and carbon dioxide, are then taken off the first cooling zone, ie. the gaseous constituents leave this zone at the top. In a second cooling zone, the combustion products are then cooled to from −40° to 0° C. and separated from the aqueous hydrochloric acid. According to a particularly advantageous embodiment, the aqueous hydrochloric acid is returned from the second cooling zone into the first cooling zone. It is particularly advantageous to operate the second cooling zone at from −10° to −20° C.

In the second cooling zone, the liquid condensates are taken off at the bottom and the gaseous constituents at the top. The liquid constituents can be returned to the first cooling zone.

The invention is further illustrated by the following Examples in which percentages are by weight.

EXAMPLE 1

A residue from the manufacture of vinyl chloride, which contains 3.7% of hydrogen, 32.2% of carbon and 64% of chlorine, is introduced, in an amount of 154 kg/h, through line 1 into a combustion chamber 3, following the procedure illustrated in FIG. 1. At the same time pure oxygen in an amount of 152 kg/h is introduced through line 2 into the combustion chamber 3. The residue to be combusted is furthermore contaminated with 550 ppm of iron.

The combustion takes place in chamber 3 under a pressure of 7 bar and at 2,500° C. The chamber is surrounded by a cooling jacket 4. The steam formed leaves through line 5, whilst fresh water is introduced into the cooling jacket through line 6.

The combustion products leave the chamber 3 through line 7. At the outlet of chamber 3, they have cooled to 650° C. The gas stream consists of the following per hour: 104 kg of HCl, 176 kg of $CO_2$, 0.1 kg of CO, 0.6 kg of oxygen, 0.1 kg of hydrogen and 27 kg of water. The chlorine content is less than 10 ppm.

The reaction gases are introduced into the loop reactor 8 (first cooling zone), which is provided with a cooler 9. By means of the latter, the 40% strength hydrochloric acid contained in the reactor 8 is cooled to temperatures of from 50° to 60° C., measured at the bottom of the reactor. The gases entering the reactor 8 through line 7 are cooled therein to from 60° to 70° C. The liquid contained in the reactor is circulated by the heat liberated, on the air-lift pump principle. The reactor is connected to the vaporizer 10 by an overflow. The vaporizer is at 160° C. The gaseous products leaving the reactor 8 and the vaporizer 10 pass through line 12 into the cooler 13 (second cooling zone), where they are cooled to 30° C. Through line 15, the gaseous products pass into a second cooler 14 where they are cooled to −18° C. The liquid, condensed products are returned to the reactor 8 through lines 16 and 17. The gaseous combustion products are removed through a valve 18 and line 19. These gaseous combustion products contain 67% of $CO_2$, 32% of HCl, 0.18% of CO, 0.42% of $O_2$, 0.05% of $H_2$, 20 ppm of $Cl_2$ and 10 ppm of water.

34 kg/h of 20% strength hydrochloric acid, in which all the iron is present in solution, in the form of iron-III chloride, are discharged through line 11.

Accordingly, combustion products are obtained which are free from iron and may be used directly for the manufacture of dichloroethane by the oxychlorination process.

EXAMPLE 2

Figure 2:
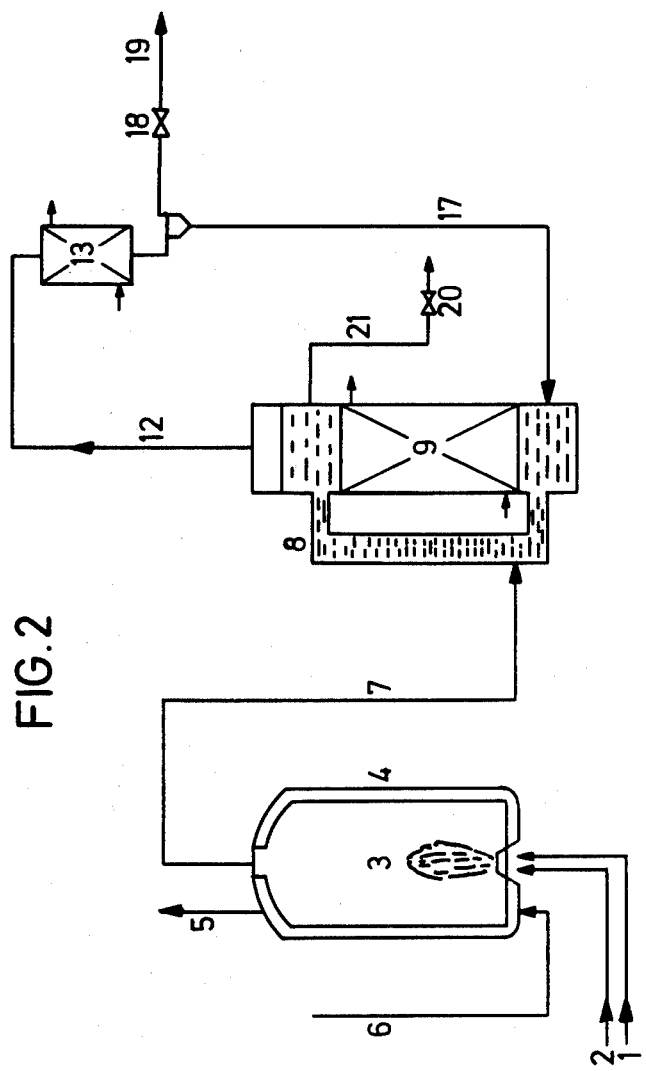
FIG. 2 illustrates a process according to the present invention, as described in Example 2.

A residue from the manufacture of vinyl chloride, which contains 3.3% of hydrogen, 32.8% of carbon, 63.9% of chlorine and 0.15% of iron is combusted by a method illustrated in FIG. 2. 167 kg/h of the chlorine-containing residue are introduced into the combustion chamber 3 through line 1. 166 kg/h of pure oxygen are introduced into the same chamber through line 2. The product combusts in a relatively short and very luminescent flame. The pressure in the combustion chamber 3 is 8.3 bar and the temperature is above 2,500° C. The combustion chamber 3 is surrounded by a cooling jacket 4. The heat of combustion, which is about 3,700 kcal/kg of combustion residue is removed by the steam forming in the cooling jacket 4. The steam leaves the cooling jacket 4 through line 5. Fresh water is fed to the cooling jacket through line 6. The combustion products leave the combustion chamber 3 at from 600° to 650° C. through line 7 and are introduced into a loop reactor 8 provided with a cooler 9. This loop reactor 8, which is filled with concentrated hydrochloric acid, forms the first cooling zone. The liquid and gas contained in the loop reactor 8 are circulated on the air-lift pump principle. The temperature at the bottom of the reactor is 60° C. The pressure in the gas phase is 7.5 bar. The liquid level in the reactor 8 is regulated by means of a valve 20. About 30 l/h of about 40% strength hydrochloric acid are removed through valve 20 and line 21. The hydrochloric acid contains about 7 g/l of iron in the form of iron(III) chloride. The gaseous products leave the loop reactor 8 through line 12 and are fed to the cooler 13, which forms the second cooling zone. In the cooler 13, the gaseous products are cooled to −18° C. and at the same time hydrochloric acid condenses in an amount of about 6 l/h and is fed to the loop reactor 8 through line 17. The gaseous products, which are under a pressure of about 7 bar, are discharged through valve 18 and line 19. The combustion products contain 63.3% of $CO_2$, 36.1% of HCl, 0.22% of $O_2$, 550 ppm of CO, <100 ppm of $H_2$, <10 ppm of $Cl_2$ and ~10 ppm of $H_2O$.

We claim:

1. A process for obtaining anhydrous hydrogen chloride from chlorine-containing organic residues by combusting these in an oxygen-containing atmosphere and separating the hydrogen chloride from the water formed during combustion, wherein the combustion of the organic residues, in which the weight ratio of hydrogen and chlorine is greater than 0.028, is carried out in an atmosphere containing more than 80% by volume of oxygen, at pressures of from 1 to 100 bar and at above 2,000° C., the combustion products are cooled to from 200° to 800° C. and are then passed into a first cooling zone which contains a solution of hydrogen chloride in water, the mixture of water, hydrogen chloride and the other combustion products is cooled to from 10° to 80° C., the gaseous mixture which contains hydrogen chloride and carbon dioxide is then discharged from the first cooling zone and cooled to from −40° C. to 0° C. in a second cooling zone, and is separated from the aqueous hydrochloric acid which condenses and is discharged from the second cooling zone.

2. A process as claimed in claim 1, wherein the combustion is carried out at above 2,200° C.

3. A process as claimed in claim 1, wherein the combustion products are cooled to from 40° to 60° C. in the first cooling zone and from −20° to −10° C. in the second cooling zone.

* * * * *